US006167612B1

(12) United States Patent
Cunliffe

(10) Patent No.: US 6,167,612 B1
(45) Date of Patent: Jan. 2, 2001

(54) APPARATUS FOR REMOTE HANDLING OF PLUGS AND SOCKETS

(75) Inventor: David Frank Cunliffe, Wigan (GB)

(73) Assignee: British Nuclear Fuels plc (GB)

( * ) Notice: Under 35 U.S.C. 154(b), the term of this patent shall be extended for 0 days.

(21) Appl. No.: 09/403,055

(22) PCT Filed: Apr. 20, 1998

(86) PCT No.: PCT/GB98/01160

§ 371 Date: Oct. 13, 1999

§ 102(e) Date: Oct. 13, 1999

(87) PCT Pub. No.: WO98/49758

PCT Pub. Date: Nov. 5, 1998

(30) Foreign Application Priority Data

Apr. 30, 1997 (GB) .................................................... 970811

(51) Int. Cl.[7] .................................................... B23P 19/00

(52) U.S. Cl. .............................. 29/747; 29/825; 320/109; 439/310; 439/500

(58) Field of Search ..................... 29/825, 747; 320/109; 439/310, 500

(56) References Cited

U.S. PATENT DOCUMENTS

| | | | | |
|---|---|---|---|---|
| 1,188,568 | * | 6/1916 | Smith | 439/310 |
| 4,076,361 | | 2/1978 | Campbell | 339/75 M |
| 4,580,862 | | 4/1986 | Johnson | 339/64 R |
| 5,131,851 | * | 7/1992 | Billger et al. | 439/34 |
| 5,467,023 | * | 11/1995 | Takeyama | 324/754 |
| 5,504,991 | | 4/1996 | Parmley, Sr. | 29/825 |

FOREIGN PATENT DOCUMENTS 0 613 763 A1 3/1994 (EP) .

* cited by examiner

*Primary Examiner*—Stephen F. Gerrity
*Assistant Examiner*—Rhonda E Sands
(74) *Attorney, Agent, or Firm*—Myers Bigel Sibley & Sajovec

(57) ABSTRACT

An apparatus for the making and breaking of a plug and socket connection within a hazardous environment by remote handling means includes at least one receiving bracket adapted to receive a positioning and retaining plate. The positioning and retaining plate has one of a plug and a socket fixed thereto in a predetermined orientation to permit making or breaking of a connection with the other of a plug and a socket. The at least one receiving bracket and the fixed plug or socket are movable in a direction parallel to the axis of the fixed plug or socket on slider means. The apparatus includes means for moving the at least one receiving bracket and the fixed plug or socket relative to the other of a plug and a socket which is fixed in a co-operating axial and rotational orientation thereto so as to make or break the connection. The at least one receiving bracket has means to permit the fixed plug or socket to be placed in or removed from the at least one receiving bracket by the remote handling means.

17 Claims, 5 Drawing Sheets

APPARATUS FOR REMOTE HANDLING OF PLUGS AND SOCKETS

The present invention relates to apparatus suitable for handling plugs and sockets remotely and, in particular though not exclusively, plugs and sockets having a plurality of individual pins and connectors therein and requiring accurate rotational and linear alignment in order to be mated without damage.

Difficulties arise in hazardous environments for example where connections between plugs and sockets have to be made and/or broken remotely by, for example, manipulator arms or other remote handling devices. Whilst manipulators are good at linear positioning, they are not so good where placement in an axial direction relative to the manipulator and rotation about the axis are required since there is frequently little or no compliance in conventional plug and socket designs and it is also frequently not possible for an operator to determine how much force is being applied by the manipulator, consequently leading to breakages. Many current plug and socket designs for use in hazardous areas are very expensive and overly complex for the use to which they are intended to be put.

In some hazardous installations such as nuclear plants, it is sometimes necessary to connect plugs and sockets which contain up to eighty individual pin and socket elements which need very accurate rotational and axial positioning to avoid damage thereto.

EP-A-0613763 describes apparatus for the remote connection and disconnection of plugs and sockets in a hostile environment such as a 'hot' cell in a nuclear plant. However, the apparatus described requires purpose designed and made plugs and sockets and also requires the use of two robotic devices used in coordination with each other. Furthermore, the plug element requires significant manipulation about its axis in order to be placed in the correct orientation in a positioning jig which then needs to be placed on the specially machined socket prior to connection of the plug thereto. Such manipulation is very difficult to achieve, especially where two manipulator/robotic arms have to be moved in unison, and is further complicated in circumstances where there may be no direct line of sight to the operation.

It is an object of the present invention to provide apparatus for making and breaking plug and socket connections easily by remote handling means such as manipulator arms for example.

According to the present invention there is provided apparatus for the making and breaking of plug and socket connections by remote handling means, the apparatus comprising: at least one receiving bracket means adapted to receive a positioning and retaining plate, the positioning and retaining plate having one of a plug or a socket fixed thereto in a predetermined orientation to permit making or breaking of the connection with the other of a socket or plug; said at least one receiving bracket and said fixed plug or socket being movable in a direction parallel to the axis of said plug or socket on slider means; and, means for moving said at least one receiving bracket and said held plug or socket relative to the other of said socket or plug which is fixed in a co-operating axial and rotational orientation thereto so as to make or break said connection.

The remote handling means may comprise a robot or manipulator for example.

The apparatus according to the present invention may have two receiving brackets to receive the plug and the socket respectively, the two brackets holding the plug and socket in a required orientation to enable a connection to be made or broken and allowing mutual relative axial movement between the two receiving brackets along a making and breaking axis.

The apparatus according to the present invention is intended to enable connections to be made between: a plug and a socket which are each disposed at the end of a flexible lead; a plug and a socket, only one of which is disposed at the end of a flexible lead, the other of the plug and socket being fixed on a piece of plant in a particular orientation for example within a hazardous area; and, a plug and a socket where the socket for example is disposed on the interior wall in a particular orientation for example of a contained hazardous area and it is necessary to make and break plug connections to that socket for power supplies to plant for example housed with the contained area. Therefore, it may only be necessary to handle and manipulate one of the plug or the socket according to the particular circumstances.

The plug and socket connections being made and broken may be for electrical connections via cables; liquid connections via hydraulic hoses for example; and, gas connections via pneumatic hoses for example. Essentially, the apparatus of the present invention may be used where connections of any type need to be made and broken. However, the apparatus of the present invention is particularly advantageous where the plug and socket contain a plurality of individual pin and socket elements, for example, and where they require to be mated in a single fixed orientation relative to each other, in particular where rotational alignment about the common plug and socket axis is required.

The receiving bracket may comprise a flat rectangular plate having a slot therein to receive the plug or socket. Opposed edges of the plate may be provided with inturned flange portions to receive and hold a co-operating flat plate to which the plug or socket is fixed in a desired orientation. Other alternative designs of receiving bracket and plug/socket fixture may be employed as will be apparent to those skilled in the mechanical engineering art. For example the receiving bracket may comprises two vertical pins which receives a plate having co-operating channels, the plate being fixed to the plug or socket.

The receiving bracket may be mounted on slider rails to allow movement along a making/breaking axis of the plug and socket. Such rails may comprise round rods for example on which the bracket is mounted via sliding bearings. Where there are two receiving brackets for the plug and socket respectively, either or both of the brackets may be movable. However, in one embodiment of the present invention, one bracket is fixed relative to the other and the connection is made or broken by movement of one bracket only. Alternatively, other forms of rails may be used instead of round rods, the only requirement being that the plug and socket be maintained in a desired relationship with respect to making and breaking of the connection without placing unnecessary stress on either component.

The moving means may be a lever arm and suitable linkage connected to the moveable receiving bracket, movement of the lever arm causing the plug and socket connection to be made or broken. Alternatively, a component of the apparatus such as the plug or socket positioning plate or the receiving bracket may be provided with a tab or other grippable feature to enable a gripper of a manipulator to move the receiving bracket in the appropriate direction. Other forms of moving means such a screw-threaded rods, pneumatic or hydraulic cylinders and piston rods for example may be employed according to circumstances as will be described hereinbelow.

Apparatus according to the present invention may include or may be mounted on a base plate or mounting fixture which may be fixed to plant or a suitable fixture within the particular environment in which it is contained. In this way only a single robotic/manipulation arm is required to effect making and breaking of the plug and socket.

A particular advantage of the apparatus of the present invention is that the manipulator only has to place the plug or socket, which is fixed to a retaining plate in a desired orientation, in the receiving bracket which is desirably generally vertical and with which the manipulator is easily able to align by virtue of appropriate movements in the horizontal plane. Alignment of the plug and socket is automatically effected by virtue of one or the other or both being placed in the receiving bracket(s) in their retaining plate. The only other function needed from the manipulator is actuation of the moving means which again is merely movement in a linear direction from one position to another and does not require any alignment by rotation or any other positioning of the plug or the socket to effect a connection.

In order that the present invention may be more fully understood, examples will now be described by way of illustration only with reference to the accompanying drawings, of which:

Figure 1:
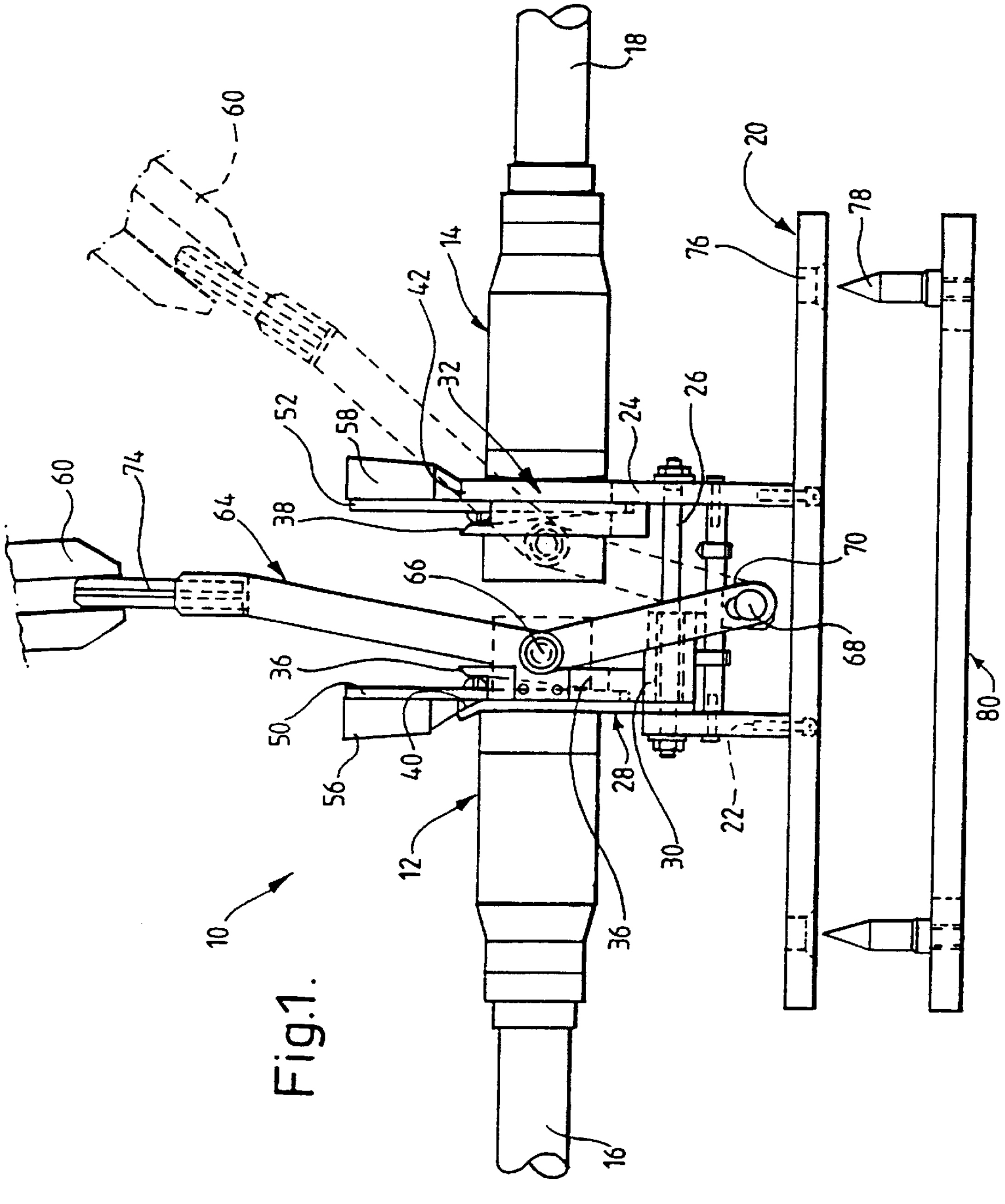
FIG. 1 shows a side elevation of an example of a first embodiment of apparatus according to the present invention including a base location plate.

Referring now to the drawings and where the same features are denoted by common reference numerals.

Figure 2:
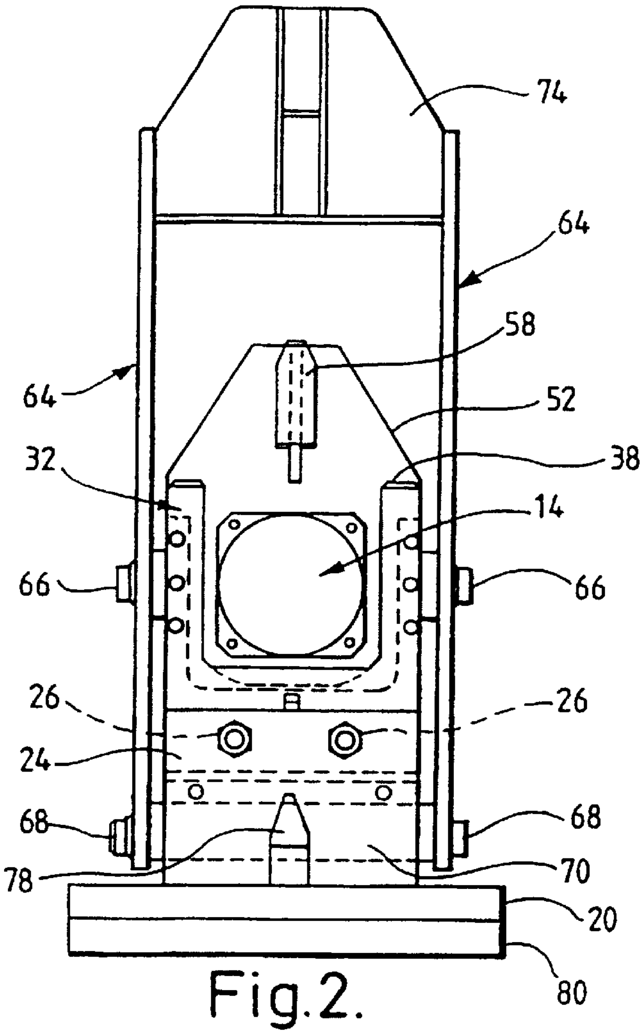
FIG. 2 shows an end elevation of the apparatus of FIG. 1.
Figure 3:
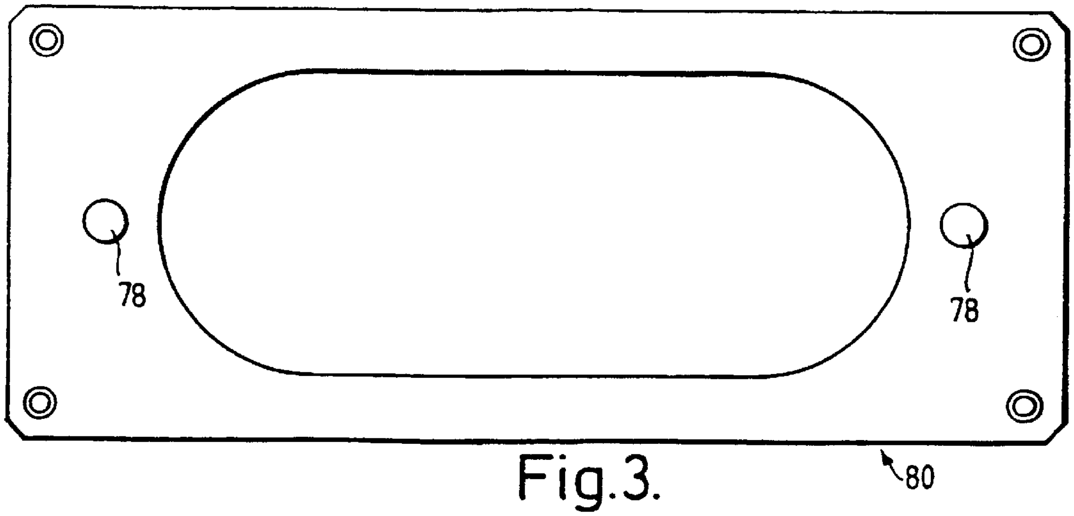
FIG. 3 shows a plan view of the base location plate of FIG. 1.

FIGS. 1 to 3 show a first embodiment 10 of apparatus according to the present invention. The apparatus is an in-line connector intended to allow making and breaking of a connection between a plug 12 and a socket 14 which are disposed on the ends of two flexible cables 16, 18, respectively for electrically linking together two pieces of plant (not shown) or a power supply to plant for example. The apparatus includes a base plate 20 having two upstanding plates 22, 24. The upstanding plate 22 is further connected to the upstanding plate 24 by two cylindrical slider rods 26 on which a first receiving bracket 28 is slidably mounted by means of bearing bushes 30 to enable the first receiving bracket 28 to move in a horizontal direction to the right as viewed in FIG. 1. The second upstanding plate 24 effectively forms a second receiving bracket 32 which is in a stationary fixed position. Both receiving brackets 28, 32 have inturned flanges 36, 38, respectively along the two vertical and bottom horizontal edges thereof. The entry portions 40, 42 into the inturned flanges 36, 38, respectively may also be provided with tapered lead-in portions so as to provide some positioning tolerance for the manipulator and ease entry of the plates 50, 52. Effectively, the first and second receiving brackets are in the form of a frame (see FIG. 2) by virtue of the central area being cut away to receive the plug 12 and socket 14 therein. The plug 12 is fixed to a first retaining plate 50 in an aperture therein in a predetermined rotational orientation, the retaining plate 50 being dimensioned to be received in the inturned flanges of the first bracket 30 and the plug 12 being fixed therein in a predetermined orientation. Similarly, the socket 14 is fixed within an aperture in a predetermined rotational orientation, cooperating with that of the plug in the first retaining plate 50, in a second retaining plate 52 dimensioned to be received within the inturned flanges of the second receiving bracket 32 in an orientation such that movement of the first receiving bracket 28 and plug 12 towards the socket will automatically result in the plug and socket mating as required regardless of how many individual mating pin and socket elements are contained in the plug 12 and socket 14. The plates 50, 52 are further provided with extension tabs 56, 58, respectively to enable them to be conveniently gripped by the gripper fingers 60 of a manipulator (not shown). A handle 64 pivoted 66 at the first receiving bracket and at its lower end 68 to a fixture 70 extending between the two upstanding plates 22, 24 is provided to enable the first receiving bracket and plug to be moved laterally with respect to the second receiving bracket and socket to enable a connection to made and broken between them. The upper end 74 of the handle 64 is conveniently shaped for gripping by the manipulator fingers 60. The base plate 20 has holes 76 which cooperate with location pins 78 on a further plate 80 which is conveniently fixed to an exposed horizontal upper surface of a piece of plant or a wall or shelf for example so as to be positively located for easy access by the manipulator.

In operation, the manipulator fingers 60 drop the plate 50 and plug 12 into the first receiving bracket 28 and the plate 52 and socket 14 into the second receiving bracket 32 when the first and second receiving brackets are in the positions indicated with the handle in the full lines indicated at the left of FIG. 1. Once the plug and socket have been positioned, the handle 64 is moved from left to right, as shown by the dashed lines, to make the connection. Essentially, the gripper 64 only needs to move the handle from one position on the left to a second position on the right, there being no other rotational or positional alignments being necessary these having been automatically accommodated by the plug and socket being held in the retaining plates 50, 52 in predetermined rotational orientations. Breaking the connection merely involves movement of the handle 64 from right to left.

Figure 4:
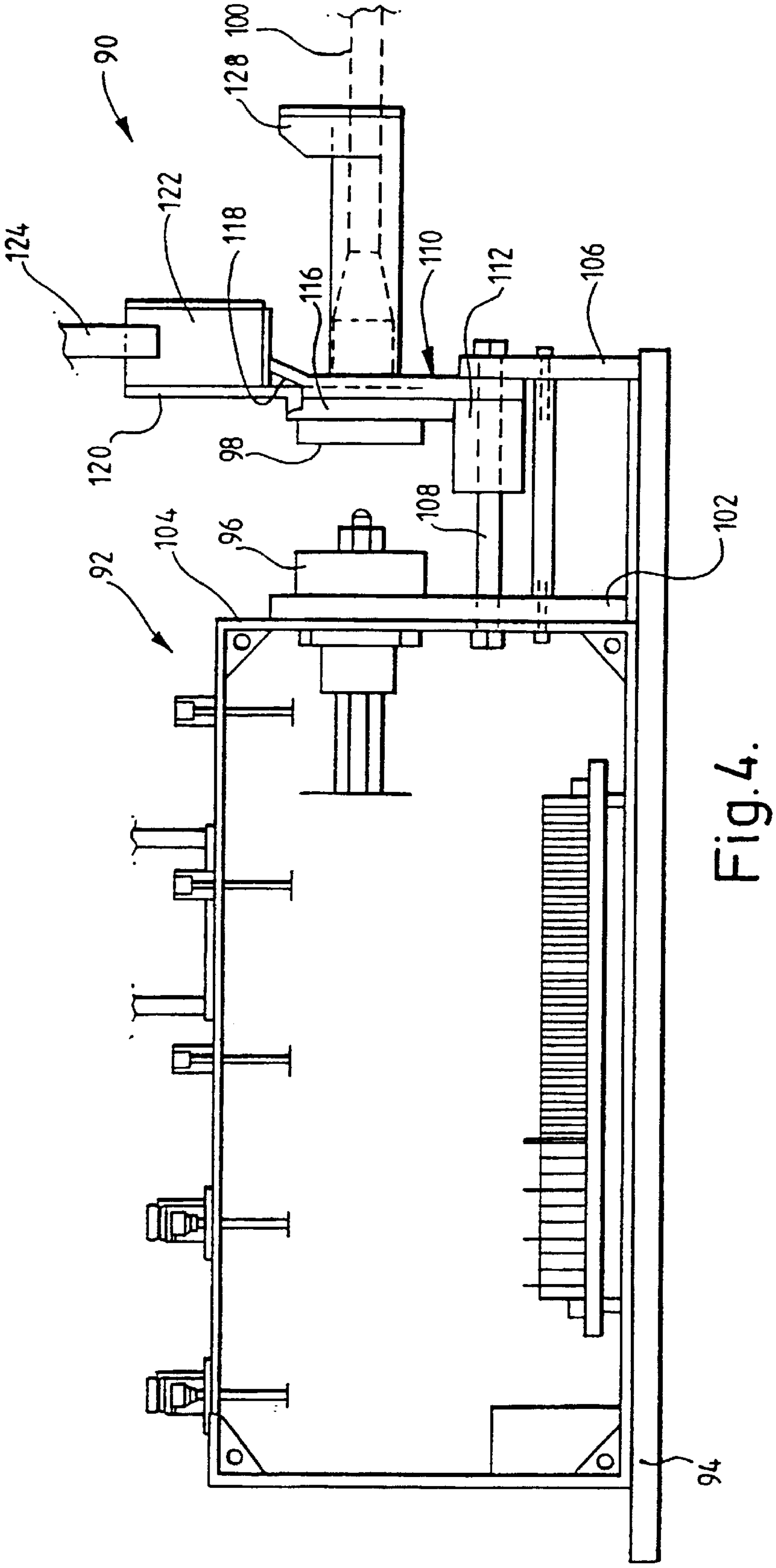
FIG. 4 shows a side elevation of a second embodiment of apparatus according to the present invention.
Figure 5:
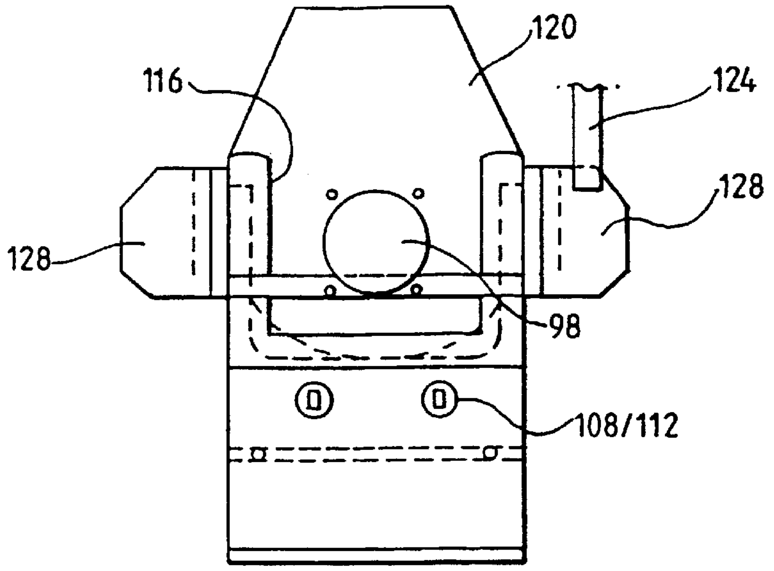
FIG. 5 shows an end elevation of the apparatus as shown in FIG. 4.

FIGS. 4 and 5 show an example of a second embodiment 90 of apparatus according to the present invention for making and breaking a connection with a junction box 92 for distributing power supplies, for example, to other items of plant or apparatus (not shown). The junction box is fixed to a convenient stable platform or base plate 94 and has an integral socket 96 to which it is desired to connect a plug 98 having a flexible power supply lead 100 (shown in part only). The apparatus 90 according to the present invention includes a face plate 102 fixed to the front face 104 of the junction box, an upstanding plate 106, slider rods 108 linking the face plate 102 and upstanding plate 106; and, a first (and only) receiving bracket 110, mounted on sliding bearing bushes 112 running on the slider rods 108, for receiving the plug 98. As in the previous embodiment, the receiving bracket has inturned flange portions 116 having a tapered lead-in 118 for receiving the plug 98 which is fixed to a positioning and retaining plate 120 in a desired orientation so as to mate with the socket 96. The plate 120 is provided with a gripping tab 122 for convenient gripping by a manipulator 124, Similarly, the receiving bracket 110 is also provided with gripping tabs 128 for gripping by the manipulator 124, the tabs 128 being set axially rearwardly of the receiving bracket 110 to allow space for the bracket 110 to be slid in a forwardly direction to allow mating of the socket 96 and plug 98.

Again, as with the embodiment described with respect to FIGS. 1 to 3, it is only necessary for the manipulator to place the plug 98 into the slot provided by the inturned flange 116 in the receiving bracket 110 by vertically placing therein via the gripping tab 122. The connection between the socket 96 and plug 98 being made and broken merely by movement of the position of the receiving bracket 110 from right to left or vice versa as seen in FIG. 4. No rotational or other positioning or orientation of the plug and socket with respect to each other is required.

Figure 6:
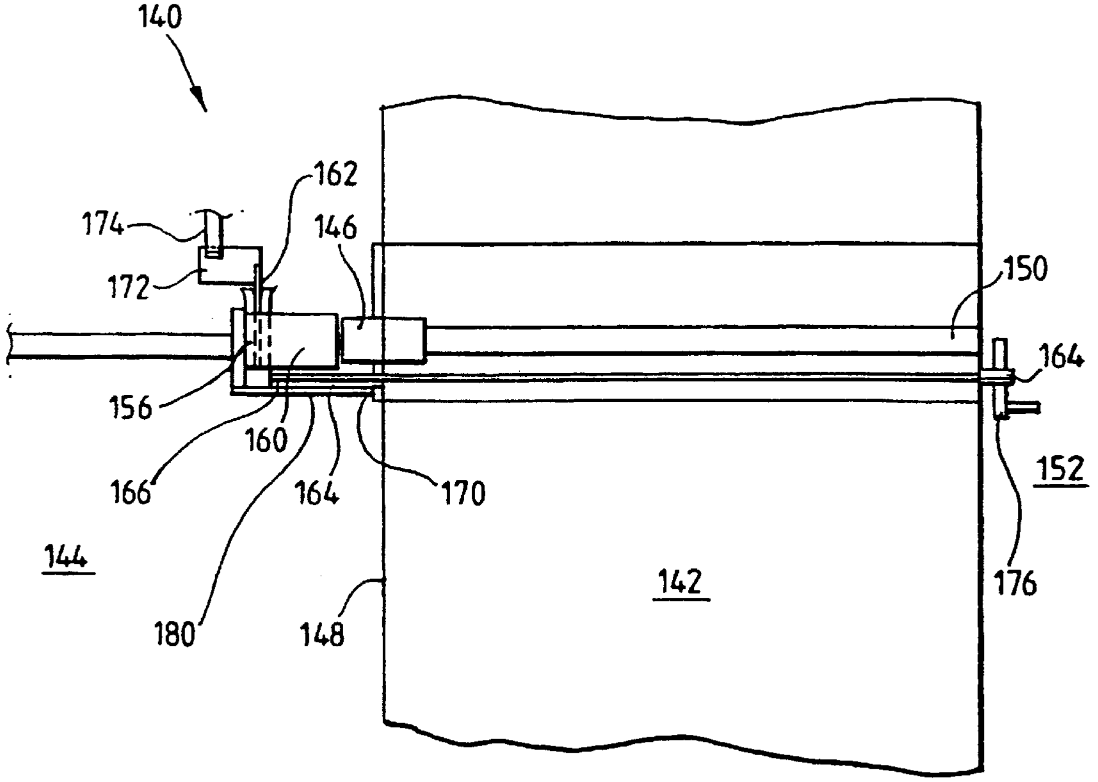
FIG. 6 shows an elevation of a schematic third embodiment of apparatus according to the present invention.

FIG. 6 shows a schematic elevation of a third embodiment 140 of apparatus according to the present invention providing a power supply through a wall 142 to the interior 144 of a cell. A socket 146 is fixed to the inside face 148 of the cell wall, the power supply lead 150 therefrom passing through the wall 142 to the outside 152. In a similar manner to the first and second embodiments, a first receiving bracket 156 is provided to receive a plug 160 fixed in a predetermined orientation, to cooperate with the socket 146, to a positioning and retaining plate 162. However, in this embodiment a screw-threaded rod 164 is rotatably fixed to the first receiving bracket 156 at the position 166 and passes through a screw-threaded plate 170 fixed to the interior wall of the cell. The end of the threaded rod 164 remote from the receiving bracket 156 is provided with a handle 176, for example, to enable rotation thereof, such rotation, depending on direction, causing the receiving bracket 156 and plug 160 to move towards or away from the socket 146 to make or break the connection therebetween. The bracket 156 moves on slider rods 180 which prevent rotation of the bracket 156. As before, the positioning plate 162 is provided with a suitable gripping tab 172 to facilitate gripping by a manipulator 174. The receiving bracket 156 may be further provided with slider rods and bearings as in the previous two embodiments in order to maintain alignment between the socket and plug and prevent any rotational tendency of the bracket 156.

In the above embodiment the handle 176 may be replaced by an electric motor drive and limit switches for example or the screwed rod 164 could be replaced by a pneumatic or hydraulic cylinder and piston rod to effect movement of the bracket 156 and plug 160. If required, the third embodiment may be further simplified by provision of a gripping tab (not shown) as with the first and second embodiments for gripping and movement of the receiving bracket by the manipulator.

FIG. 7 shows two schematic diagrams of examples of how the three preceding embodiments may be employed in practice.

Figure 7A:
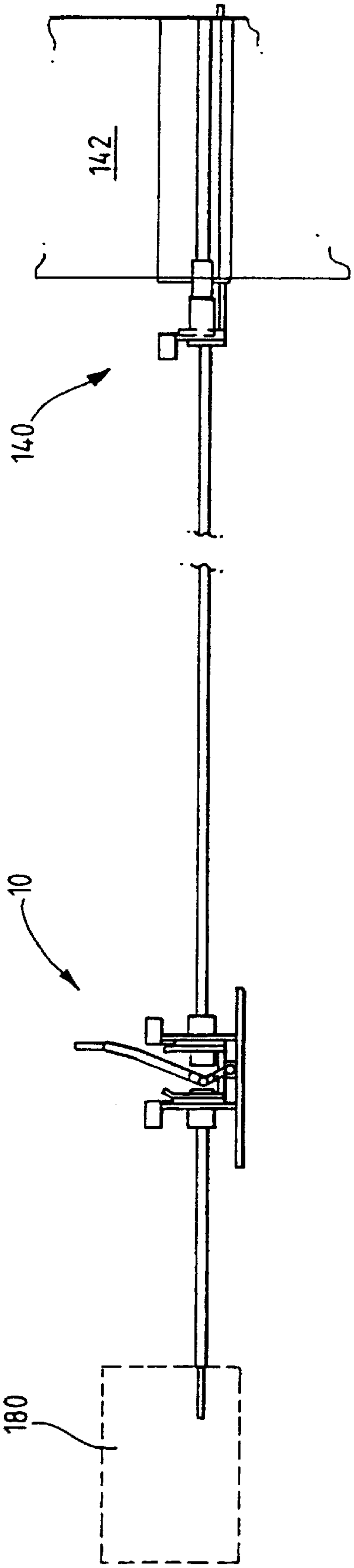
FIGS. 7A and 7B which show schematic diagrams of how the three different embodiments shown in the preceding figures might be incorporated into an example of a practical closed hazardous environment.

FIG. 7A shows the third embodiment 140 supplying power to, for example, an oven 180 via an in-line connector of the first embodiment 10.

Figure 7B:
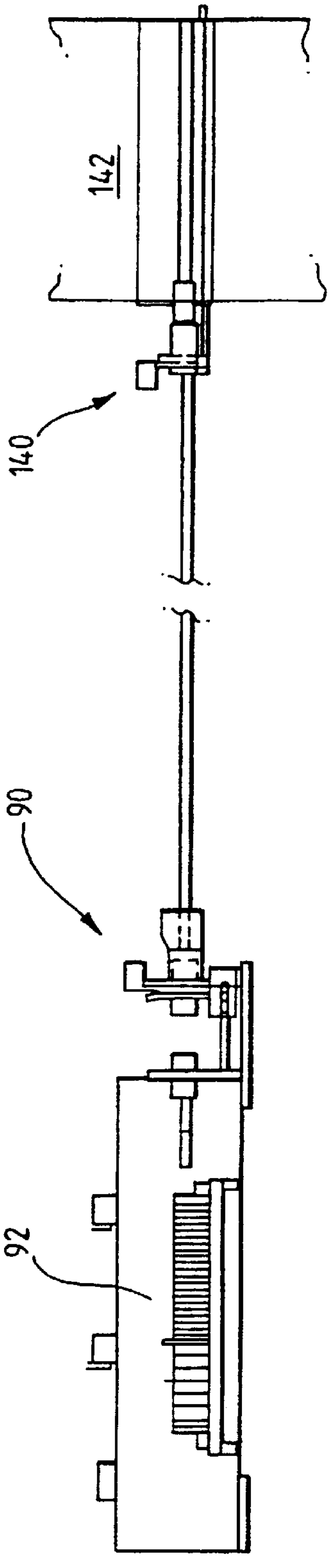

FIG. 7B shows an example of the third embodiment 140 supplying power to a terminal connector box 92 via an example of the second embodiment 90.

There are very many other examples of where the apparatus according to the present invention may be employed in hazardous areas and also in so-called clean areas which are not hazardous but are required to be kept clean and free of contaminants such as in electronic assembly areas or in pharmaceutical manufacturing areas for example.

Thus, it will be clear that the apparatus of the present invention provides an economic, more efficient and much simplified means of remotely making and breaking plug and socket connections, especially where such connections need to be made between rotationally orientated plug and sockets.

What is claimed is:

1. An apparatus for the making and breaking of a plug and socket connection within a hazardous environment by remote handling means, the apparatus comprising: at least one receiving bracket adapted to receive a positioning and retaining plate, the positioning and retaining plate having one of a plug and a socket fixed thereto in a predetermined orientation to permit making or breaking of a connection with the other of a plug and a socket; said at least one receiving bracket and said fixed plug or socket being movable in a direction parallel to the axis of said fixed plug or socket on slider means; and means for moving said at least one receiving bracket and said fixed plug or socket relative to the other of a plug and a socket which is fixed in a co-operating axial and rotational orientation thereto so as to make or break said connection; wherein said at least one receiving bracket has means to permit said fixed plug or socket to be placed in or removed from said at least one receiving bracket by said remote handling means.

2. The apparatus according to claim 1 having two receiving brackets to receive the plug and the socket, respectively.

3. The apparatus according to claim 2 wherein one of said receiving brackets is in a fixed position.

4. The apparatus according to claim 1 wherein said receiving bracket comprises a flat rectangular plate having a slot therein to receive the fixed plug or socket.

5. The apparatus according to claim 4 wherein opposed edges of the plate are provided with inturned flange portions to receive and hold the co-operating positioning and retaining plate to which the fixed plug or socket is fixed in a desired orientation.

6. The apparatus according to claim 1 wherein said receiving bracket comprises two vertical pins and receives a plate having co-operating channels, the plate being fixed to the fixed plug or socket.

7. The apparatus according to claim 1 wherein the receiving bracket is mounted on slider rails to allow movement along a making/breaking axis of the plug and socket.

8. The apparatus according to claim 7 wherein the rails comprise round rods on which the bracket is mounted via sliding bearings.

9. The apparatus according to claim 1 wherein the moving means includes a lever arm and suitable linkage connected to the moveable receiving bracket.

10. The apparatus according to claim 1 wherein the moving means includes a tab fixed to said receiving bracket for gripping by a manipulator.

11. The apparatus according to claim 1 wherein the moving means comprises at least one of: a screw-threaded rod; a pneumatic cylinder; a hydraulic cylinder; and a piston rod.

12. The apparatus according to claim 1 wherein said plug and socket connection being made and broken forms a part of at least one of an electrical connection via cables; a liquid connection via hoses; and a gas connection via hoses.

13. The apparatus according to claim 1 further including a base plate for fixing said apparatus to a firm surface.

14. An apparatus for the making and breaking of a connection between a plug and a socket within a hazardous environment by a remote handling device, the apparatus comprising:

a first element and a second element fixed in a co-operating axial and rotational orientation to said first element, said first element being one of a plug and a socket and said second element being the other of a plug and a socket;

a positioning and retaining plate having said first element fixed thereto in a predetermined orientation; and a receiving bracket adapted to receive said positioning and retaining plate;

wherein said receiving bracket and said first element are movable relative to said second element so as to make or break said connection;

wherein said receiving bracket and said first element are movable in a direction parallel to an axis of said first element;

wherein said receiving bracket permits said first element to be placed in or removed from said receiving bracket by said remote handling device.

15. The apparatus of claim 14 including an actuator operative to move said receiving bracket and said first element relative to said second element.

16. An apparatus for the making and breaking of a plug and socket connection within a hazardous environment by remote handling means, the apparatus comprising: at least one receiving bracket adapted to receive a positioning and retaining plate, the positioning and retaining plate having one of a plug and a socket fixed thereto in a predetermined orientation to permit making or breaking of a connection with the other of a plug and a socket; said at least one receiving bracket and said fixed plug or socket being movable in a direction parallel to the axis of said fixed plug or socket on slider means; and means for moving said at least one receiving bracket and said fixed plug or socket relative to the other of a plug and a socket which is fixed in a co-operating axial and rotational orientation thereto so as to make or break said connection; wherein said at least one receiving bracket has means to permit said fixed plug or socket to be placed in said at least one receiving bracket by said remote handling means.

17. An apparatus for the making and breaking of a connection between a plug and a socket within a hazardous environment by a remote handling device, the apparatus comprising:

a first element and a second element fixed in a co-operating axial and rotational orientation to said first element, said first element being one of a plug and a socket and said second element being the other of a plug and a socket;

a positioning and retaining plate having said first element fixed thereto in a predetermined orientation; and a receiving bracket adapted to receive said positioning and retaining plate;

wherein said receiving bracket and said first element are movable relative to said second element so as to make or break said connection;

wherein said receiving bracket and said first element are movable in a direction parallel to an axis of said first element;

wherein said receiving bracket permits said first element to be placed in said receiving bracket by said remote handling device.

* * * * *